(12) United States Patent
Tegegne et al.

(10) Patent No.: US 10,242,212 B2
(45) Date of Patent: Mar. 26, 2019

(54) PRESERVING DATA PROTECTION AND ENABLING SECURE CONTENT AWARENESS IN QUERY SERVICES

(71) Applicant: QUEST SOFTWARE INC., Aliso Viejo (CA)

(72) Inventors: Abel Tegegne, Ottawa (CA); Elena Vinogradov, Kanata (CA); Guangning Hu, Kanata (CA)

(73) Assignee: QUEST SOFTWARE, INC., Aliso Viejo, CA (US)

( * ) Notice: Subject to any disclaimer, the term of this patent is extended or adjusted under 35 U.S.C. 154(b) by 177 days.

(21) Appl. No.: 15/132,120

(22) Filed: Apr. 18, 2016

(65) Prior Publication Data

US 2017/0300702 A1    Oct. 19, 2017

(51) Int. Cl.
   *G06F 21/62*      (2013.01)
   *G06F 17/30*      (2006.01)
   *H04L 29/06*      (2006.01)

(52) U.S. Cl.
   CPC .... *G06F 21/6218* (2013.01); *G06F 17/30528* (2013.01); *H04L 63/10* (2013.01)

(58) Field of Classification Search
   None
   See application file for complete search history.

(56) References Cited

U.S. PATENT DOCUMENTS

| | | | | |
|---|---|---|---|---|
| 6,807,277 B1 * | 10/2004 | Doonan | ............. | H04L 63/0823 380/264 |
| 8,838,704 B2 * | 9/2014 | Naylor | ............... | H04N 1/00209 709/204 |
| 9,317,574 B1 * | 4/2016 | Brisebois | ............... | G06Q 50/01 |
| 9,349,016 B1 * | 5/2016 | Brisebois | ................ | H04L 63/20 |
| 9,390,240 B1 * | 7/2016 | Brisebois | ............... | G06F 21/31 |
| 9,501,744 B1 * | 11/2016 | Brisebois | ............... | G06N 5/048 |
| 9,563,782 B1 * | 2/2017 | Brisebois | ............... | G06F 21/62 |
| 9,569,626 B1 * | 2/2017 | Brisebois | ............... | G06F 21/60 |
| 9,578,060 B1 * | 2/2017 | Brisebois | ............... | H04L 63/20 |
| 9,641,555 B1 * | 5/2017 | Brisebois | ............... | G06F 21/60 |
| 9,779,260 B1 * | 10/2017 | Brisebois | ............... | G06F 21/62 |
| 2004/0107347 A1 * | 6/2004 | Ogino | ..................... | G06F 21/10 713/176 |

(Continued)

OTHER PUBLICATIONS

Foxit Reader—Secure PDF Reader / Foxit Software, "Foxit Reader 8.0—Award-winning PDF Reader," URL: https://www.foxitsoftware.com/products/pdf-reader/ (6pgs).

*Primary Examiner* — Malcolm Cribbs
(74) *Attorney, Agent, or Firm* — Maschoff Brennan (57) ABSTRACT

Embodiments of the present disclosure include systems and methods for providing query service of secured contents. A data collection service collects data and security context associated with the data from a data source and stores the data with the security attributes in a datastore, where the security attributes are derived from the security context and used to determine access to the data so that access to the data is consistent with the security context. Upon receiving a query and a user context of a requester making the query of the datastore, a set of query results is obtained. Based on the user context and security attributes, it is determined whether the requestor has a proper right to access the query results. If the requestor has a proper right to access the query results, access to the query results is granted.

16 Claims, 6 Drawing Sheets

(56) References Cited

U.S. PATENT DOCUMENTS

| | | | |
|---|---|---|---|
| 2005/0182767 A1* | 8/2005 | Shoemaker | G06F 17/30575 |
| 2009/0083840 A1* | 3/2009 | Jensen | G06N 5/04 |
| | | | 726/6 |
| 2010/0268722 A1* | 10/2010 | Yalamanchi | G06F 17/30958 |
| | | | 707/759 |
| 2011/0060915 A1* | 3/2011 | Tal | G06F 21/6218 |
| | | | 713/189 |
| 2012/0246150 A1* | 9/2012 | Comi | G06F 17/30289 |
| | | | 707/722 |
| 2013/0179495 A1* | 7/2013 | Eom | G06F 9/5072 |
| | | | 709/203 |
| 2013/0238659 A1* | 9/2013 | Roitman | G06F 21/6227 |
| | | | 707/781 |
| 2014/0189777 A1* | 7/2014 | Viswanathan | H04L 63/105 |
| | | | 726/1 |
| 2016/0078245 A1* | 3/2016 | Amarendran | G06F 21/6218 |
| | | | 713/193 |
| 2016/0210470 A1* | 7/2016 | Rozenberg | G06F 17/30315 |

\* cited by examiner

FIG. 6

PRESERVING DATA PROTECTION AND ENABLING SECURE CONTENT AWARENESS IN QUERY SERVICES

A. TECHNICAL FIELD

The present invention relates to management of data security in query services, more particularly, to systems and methods for preserving data protection and secure content awareness enablement in query services.

B. DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Analytics/Administration solution allows viewing processes, such as aggregates, and raw contents, such as emails and document bodies of an organization. In an analytics/administration solution, access to such contents is usually restricted by assigning a role to each user so that the user is allowed or denied access to a particular resource. This role-based access to a resource or content is commonly an all or nothing approach in that it will either allow or deny access to the resource or contents. However, not all resource or contents have the same level of sensitive information. Existing approaches do not have mechanisms to conditionally restrict access to contents that are processed during data collection using various techniques (such as, Information Rights Management, Messaging Records Management, Auditing, Compliance Features, and Data Loss Prevention) and other security metadata/attribute information associated with the contents.

In the conventional systems, the initial security metadata/attribute information associated with the contents is not preserved when the contents are collected and stored. Thus, when a user accesses the data through the traditional solution, the user's level of access is not based on the security information, such as security attributes, metadata, and data classification information, that was originally assigned to the contents; rather, as discussed above, the level of access is bases on a role or group of the user. As the original security information assigned to the content is ignored, the integrity of the security of the original contents is not maintained.

Typically, the conventional approaches use a super privileged user profile to gain access to all/most contents and to be able to process and store the contents during data collection. However, once the content is processed and stored, the content that was accessible only to a privileged user now becomes available to all privileged users of a query service directly and to all privileged users of the Analytics/Administration solution indirectly.

As such, there is a need for an approach that uses at least one of right management services (RMS), contents, metadata, and other types of security information to restrict access to the contents that is consistent with its original restrictions.

BRIEF DESCRIPTION OF THE DRAWINGS

References will be made to embodiments of the present disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Elements/components shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components/elements. Components/elements may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize that: (1) certain steps may optionally be performed; (2) steps may not be limited to the specific order set forth herein; and (3) certain steps may be performed in different orders; and (4) certain steps may be done concurrently.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," or "in embodiments" in various places in the specification are not necessarily all referring to the same embodiment or embodiments. The terms "include," "including," "comprise," and "comprising" shall be understood to be open terms and any lists that follow are examples and not meant to be limited to the listed items. Any headings used herein are for organizational purposes only and shall not be used to limit the scope of the description or the claims.

Furthermore, the use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Embodiments described herein use the Analytics/Administration solution as an exemplary software application that receives a query from a user and provides analytics to the user; however, it shall be noted that the current disclosure is not limited to use only with the Analytics/Administration solution. Rather, aspects of the present disclosure may be used in other applications that collect/store data and provide analytic report or insight of the data to the user in response to a query. Also for the purpose of illustration, embodiments describe herein use emails as exemplary data controlled by an analytics/administration service; however, it shall be noted that the current disclosure is not limited to use only with emails or communication related data. Rather, aspects of the present disclosure may be used in controlling access to other types of data and contents.

The embodiments of the present disclosure include a solution that uses at least one of Information Rights Management (IRM), content, metadata, and other types of security information to restrict access to contents in an analytics/administration service. For instance, unlike in the existing systems that uses all or nothing approach in accessing documents, the analytics/administration service uses rights information, email header, email content, and other related attributes to restrict access or show partial contents of the emails.

Figure 1:
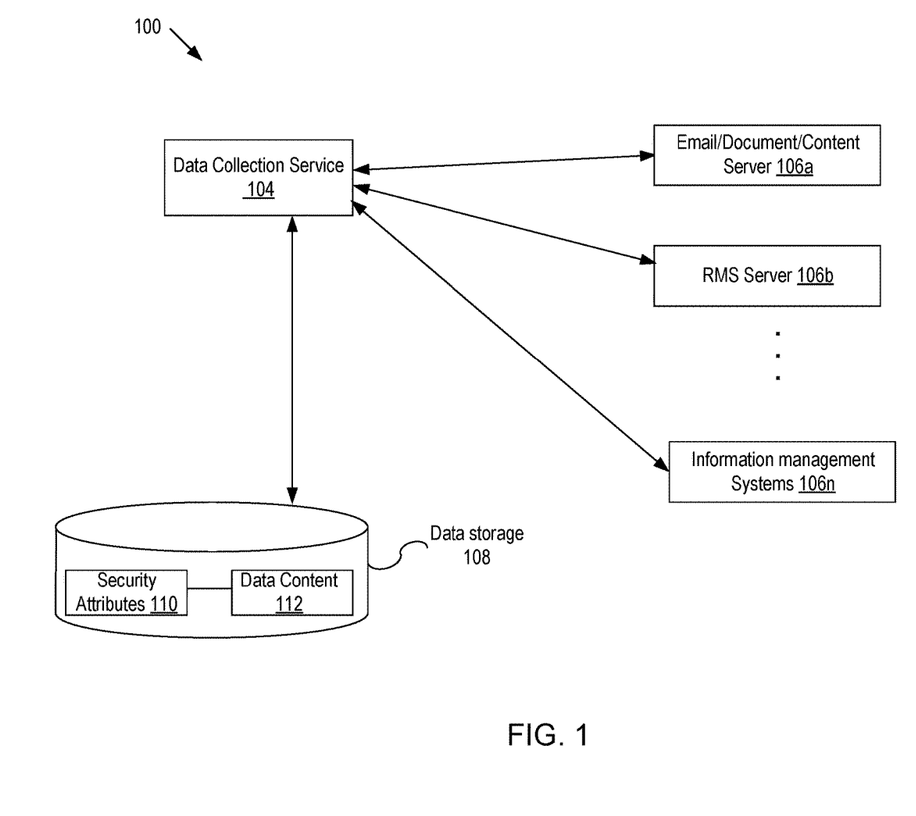
FIG. 1 shows a data collection system according to embodiments of the present disclosure.

FIG. 1 shows a data collection system 100 according to embodiments of the present disclosure. As depicted, the data collection service 104 may interact with and gather data from various data sources, such as email/document/content server 106a, RMS server 106b, and information management systems 106n. For the purpose of illustration, only three types of data sources are shown in FIG. 1. However, it should be apparent to those of ordinary skill in the art that the data collection service 104 may collect data from other suitable types and number of data sources.

In embodiments, the data collection service 104 is given permission that can access all or a portion of documents in each data source 106. In embodiments, the data collection service 104 may go through the data documents and/or secure contents in the data sources 106 and obtain each data content item with its associated security context assigned to the data content item (or, shortly data), process the data, and store both the processed data content 110 and security attributes 112 as metadata in the data storage 108. For instance, the data collection service 104 may collect emails from the email/document/content server 106a. The security context of each email may include security related information, such as information of sender, recipients in the list of carbon copy (Cc), recipients in the list of blind Carbon copy (Bcc)), types of encryption if the email is encrypted, email access permission (to a person or a group) and data security classification. The security context may also include other information of access permission control, such as organization policies/rules and settings/restrictions to access the email. The security attributes are extracted from the security context and may include document properties, email headers/x-headers, RMS License Properties, File System (File and Folder) Permissions, data loss prevention (DLP) and Classification metadata (e.g. Windows FCI—File Classification Infrastructure), metadata managed by a browser-based document management platform, such as Sharepoint, New-Technology-File-System (NTFS) alternate data stream (ADS), image/exchangeable-Image-File-Format (exif) metadata, custom attributes stored in a database etc.

In embodiments, the data collection service 104 may collect a document stored in the computer of an employee in an organization, where only the employee has the access to the document. The data collections service 104 stores the document in the data storage 108 along with the security attributes 110, where the security attributes indicates the access is limited to the employee. When a user other than the employee attempts to access the document stored in the data storage 108, the access information stored in the security attributes is used to deny access to the document. In embodiments, the security attributes of data may include other information associated with permission and access control, depending on the type of the data.

The data collection service 104 processes the data before storing in the data storage 108 for future use from other services, such as archive service, query service and other analytics/administration service. In embodiments, the data collection service 104 may inspect the content, its metadata and its original security attributes to determine which part of the collected data needs to be protected and how to protect it. In embodiments, this determination may be based on at least one of the Information Rights Management (IRM) information associated with the content, metadata information associated with the content (such as email header or x-header added during the sending of the email), items in the content, such as keywords included in the content, and other security and data classification information associated with the content.

In embodiments, after the data collection service 104 determines that the content of the data needs to be protected, it uses one or more protection schemes (or, equivalently format) that are consistent with the original security context, where the original security context refers to the protection scheme used by the original data source 106 of the data. For instance, if the content is already RMS protected (encrypted) by the RMS server 106b, the data collection service 104 stores the content in the data storage 108 along with the security attributes 110, where the security attributes indicates the content is RMS protected. In another example, if the data collection service 104 has the privilege to access the files in the RMS server 106b and determines that the content need to be RMS protected, data collection service 104 may request the RMS server 106b encrypt the content. Then, the data collection service 104 stores the encrypted content in the data storage 108 along with the security attributes 110, where the security attributes indicates the content is protected by the RMS server 106b. For the purpose of illustration, the RMS server 106b is considered as the original data source that protects (encrypts) the content. However, it should be apparent to those of ordinary skill in the art that the data collected by the data collection service 104 can be protected by other suitable data sources.

In embodiments, if the content is not protected by its original data source, but contains sensitive information, the data collection service 104 may use other protection mechanisms, such as symmetric or asymmetric encryption. In embodiments, some attributes, such as aggregate, summary or statistical information about the content may not be protected, where the statistical information may include number of words, number of receivers, date of creation, and date when the email is sent. In embodiments, the data may not need any protection. For instance, an email with just To, CC, and BCC, and its original data source did not have any protection, the data collection service 104 may store the data without further processing.

In embodiments, the data collection service 104 may encrypt the security attributes 110 and the data content 112 before storing them in the data storage 108, where the encryption is in an additional format that is independent of the original security context.

In embodiments, the data collection service 104 collects the data from the data sources 106 on a scheduled basis or collects the data each time the data is handled by the data sources. In embodiments, the data collection service 104 runs as a background application where the data sources 106 include communication application, such as Exchange Server® software application and CISCO Communication Server® software application. It is noted that the data collection service 104 communicates with the data sources 106 and the data storage 108 via various types of conventional communication connections, such as wireless communication, Internet, LAN, WAN, so on. For the purpose of illustration, each data source is represented as a server. However, it should be apparent to those or ordinary skill in the art that each data source can be other suitable type of computer hardware, software, and/or firmware, that has the similar functions of the data sources 106 described above.

Figure 2:
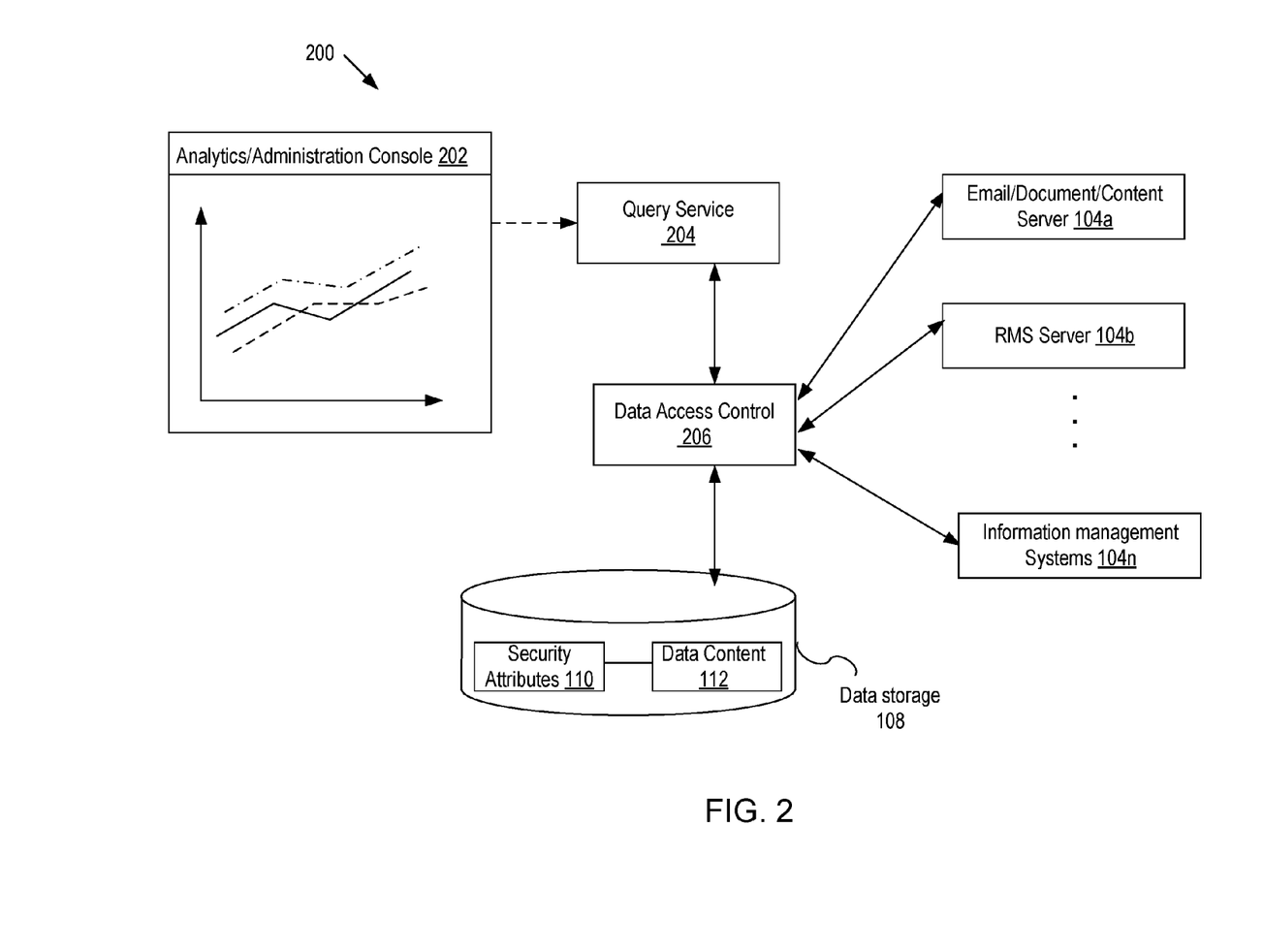
FIG. 2 shows a query service system according to embodiments of the present disclosure.

FIG. 2 shows a query service system 200 according to embodiments of the present disclosure. As depicted, the query service 204 receives a query from a user through an analytics/administration service 202. When a query (or, request) to access a protected data in the database 108 is received by the query service 204, the query service 204 inspects the user context of the query requester to determine whether the use has either the right or the necessary key (for asymmetric encryption) to unprotect (or, equivalently, decrypt) a protected content in the database 108.

In embodiments, the user context includes at least the user's identification (ID) information that is used to uniquely identify the user and other information, such as where the query is sent from. In a Microsoft Windows® operating system, the user context may include security ID (SID) of the user principal. In Microsoft Windows Azure® clouding platform, the user context may include the object ID of the user's Active Directory entry.

The query is sent to the query service 204 through the analytics/administration service 202, where the analytics/administration service 202 provides a user interface that allows the user to input the query and displays the analytics output on its display. It should be apparent to those of ordinary skill in the art that the user may send a query to the query service 204 through other suitable types of software applications that are similar to the Analytics/Administration solution.

The query service 204 sends user context and optionally data/content identifier (ID) to the data access control 206. Based on the user context and data/content identifier received from the query server 204, the data access control 206 retrieves the security attributes 110 that corresponds to the data/content. Also, the data access control 206 may contact external systems, such as RMS server 106b, for privilege/access information and/or contact Active Directory (AD) for AD information. In embodiments, if the data is RMS protected, the data access control 206 sends the user context and data/content ID to the RMS server 106b so that the RMS server 106b can determine whether the user has the right to access the data/content. In another example, the data access control 206 gets the user's email address from AD and determine whether the user is a part of the email recipient or sender before allowing access to the email content. In yet another example, the data access control 206 gets the user's group membership before allowing access to document content that is restricted to a certain group membership.

In embodiments, using the security attributes, the privilege/access information, AD information, and any other suitable information, the data access control 206 may determine whether the user has privileges to access the content.

When the data access control 206 determines that the user has the necessary right/privilege to access the requested data, it retrieves the requested data from the data storage 108 and sends the data to the query service 204, which in turn sends the data to the analytics/administration service 202 so that the data is displayed to the user. If the user does not have the necessary right, the data access control 206 returns nothing to the query server 204.

Optionally, the data access control 206 may return contents that contains only non-sensitive data and sends the data to the query service 204, where the non-sensitive portion refers to a portion of the data that is not encrypted and/or has a very minimal security level. (Hereinafter, the term "a portion of data" refers to either entire data or a fraction of the data.)

By way of example, the conventional system does not typically store the security attributes with emails; instead, the conventional systems merely store the emails and allow anyone who has the privilege to look at all of the emails in the box. In contrast, in embodiments, the security data assigned to each email can be used to allow partial access to the email. When a user accesses the emails stored in the data storage 108 through a query service, a data access control 206 can use the security rights information, email header, email content and other security attributes of each email to restrict access or show partial content of each email, i.e., redacted content of each email can be accessed by the data access control.

In embodiment, the data access control 206 determines that the user has the right to access the data, where all or portion of the data is encrypted by the original data source, e.g., RMS server 106b. In such a case, the data access control 106b may contact the RMS server 106b so that the RMS server decrypts the data and return the decrypted data to the data access control 106b. In embodiments, the data access control 206 may use the user context to access the content of the data via an RMS aware application program interface (API) or software developer's kit (SDK). The RMS aware application uses the user context to read the RMS protected data if the user has the right to access the protected data.

In embodiments, the requested data is not protected by its original data source, such as RMS server 106b, but contains sensitive information. In such a case, the data collection service 104 may use other protection mechanisms, such as symmetric or asymmetric encryption, before it stores the encrypted data into the data storage 108. When the user of the analytics/administration 202 sends a query that includes the decryption key, the data access control 206 may decrypt the data using the key and send the decrypted data to the query service 204.

By way of example, in embodiments, for a regular email with no protection by the original data source, the data collection service 104 may be able to read the "To", "CC", "BCC", "From" and body content of the email. The security attributes 110 stored in the data storage 108 may also contain this information. When a user of the analytics/administration 202 queries the email, the data access control 206 may check if the user is on the "To", "CC", "BCC", "From" list using the user context and data/content ID. If he is not on the list, the data access control 206 would not allow the user to access the email via the analytics/administration service 202.

In another example, in embodiments, for an email that is classified as "Secret" and is configured to be readable only to a certain Active Directory group, the data collection service 104 may be able to read the email metadata and body. If a user of the analytics/administration service 202 is not a member of the AD group, the data access control 206 would not allow the user to access the email via the analytics/administration service 202.

In yet another example, in embodiments, for an email that has a keyword that is deemed sensitive and is configured to be readable only to a certain Active Directory group, the data collection service may be able to read the email metadata and body. If a user of the analytics/administration service 202 is not a member of the AD group, the data access control 206 would not allow the user to access the email via the analytics/administration service 202.

In still another example, in embodiments, for a document that is stored in a folder with permission applied on the document or folder, the data collection service 104 will be able to read the metadata and content of the document. If a user of the analytics/administration service 202 has file/folder permission to the original document, the data access control 206 would allow the query requester to access the document via the analytics/administration service 202.

In further another example, in embodiments, for a document that only an employee is allowed to access and RMS protected, the data collection service 104 will not be able to read the content of the document. If a user of the analytics/administration service 202 attempts to access the document, the data access control 206 would determine if the user has the right to access the document. If the user has the right, the data access control 206 sends the document to the RMS server 106b so that the RMS server 106b decrypts document and sends the decrypted documents to the data access control 206.

Figure 3:
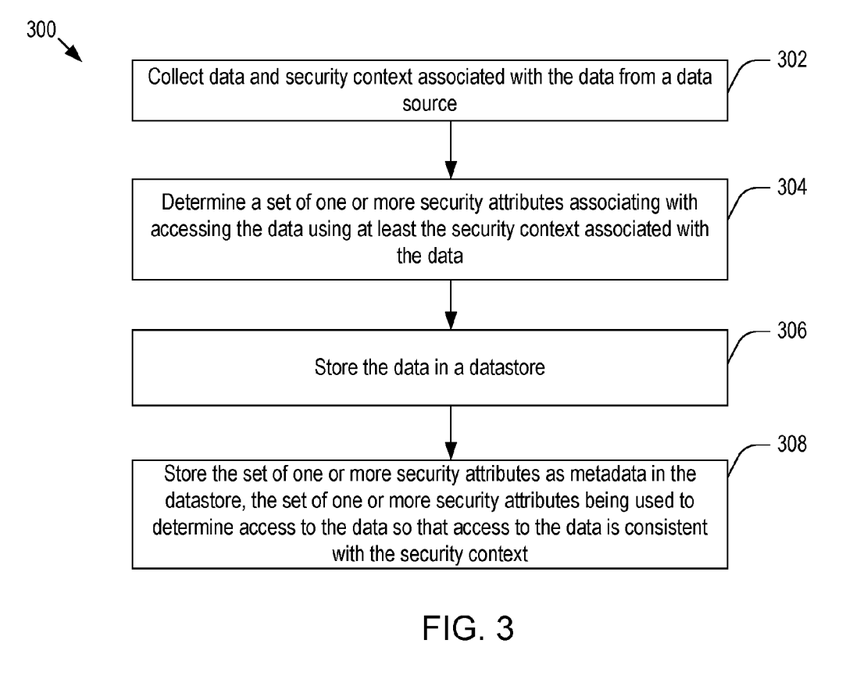
FIG. 3 shows a flowchart of an illustrative process for collecting data according to embodiments of the present disclosure.

FIG. 3 shows a flowchart 300 of an illustrative process for collecting and storing data according to embodiments of the present disclosure. At step 302, the data collection service 104 collects data and security contents associated with the data from data sources 106. For the purpose of illustration, the data is assumed to be an email that was sent by the CEO of a company and includes a body and a subject having "project X." Also, it is assumed that the body of the email is RMS protected, while the subject is not.

At step 304, the data collection service 104 determines a set of one or more security attributes associating with accessing the data, using at least the security context associated with the data. (Hereinafter, the term "a set of" refers to a collection of one item or multiple items.) In embodiments, the data collection service 104 may inspect the content of the data, its metadata and its original security context to determine which part of the collected data needs to be protected (encrypted) and how to protect it. In embodiments, this determination may be based on the Information Rights management (IRM) information associated with the content, metadata information associated with the content (such as email header or x-header added during the sending of the email), items in the content such as keywords included in the content, and other security and data security classification information associated with the content.

In embodiments, responsive to the decision that the data needs protection, the data collection service 104 protects the all or some of the data in a protection format that is consistent with the original security context, where the original security context includes the original protection method that the original data source 106 of the data used to protect the data. For instance, if the content is already RMS protected (encrypted) by the RMS server 106b, the data collection service 104 stores it in the data storage 108 without further processing. In another example, if the data collection service 104 has the privilege to access the files in the RMS server 106b and determines that the content need to be RMS protected, data collection service 104 may contact the RMS server 106b so that the RMS server 106b encrypts the content and sends the encrypted data to the data collection service 104. At step 306, the data is stored in the data storage (or, equivalently, datastore) 108. Also, at step 308, the data collection service 104 stores the set of one or more security attributes as metadata in the data storage 108, wherein the set of one or more security attributes is used to determine access to the data so that access to the data is consistent with the security context.

In embodiments, if the content is not protected by its original data source, but contains sensitive information, the data collection service 104 may use other protection mechanisms, such as symmetric or asymmetric encryption, before storing the data into the data storage 108. In embodiments, the security attributes and the data may be encrypted in an additional format that is independent of the security context before they are stored in the data storage 108.

The convention systems ignore the original security information/attributes/format assigned to the data content, such as the information of the encryption used to protect all or some of the data. In contrast, in embodiments, the data collection service 104 stores all or portion of the data in a protection scheme that is consistent with the original protection format and stores the security attributes of the data content along with the data content in the data storage 108. As such, this feature preserves the integrity of the original security protection. Furthermore, in embodiments, only a portion of the data may be security protected while the other portion may not be security protected, i.e., a redacted portion of the data is security protected. For instance, the body of the email is security protected while the subject is not security protected. This feature allows a user to search for the emails that has the key word "project X" even if the user does not have any right to access or encryption key of the body of the email. As such, this feature allows different levels of access to the data.

Figure 4:
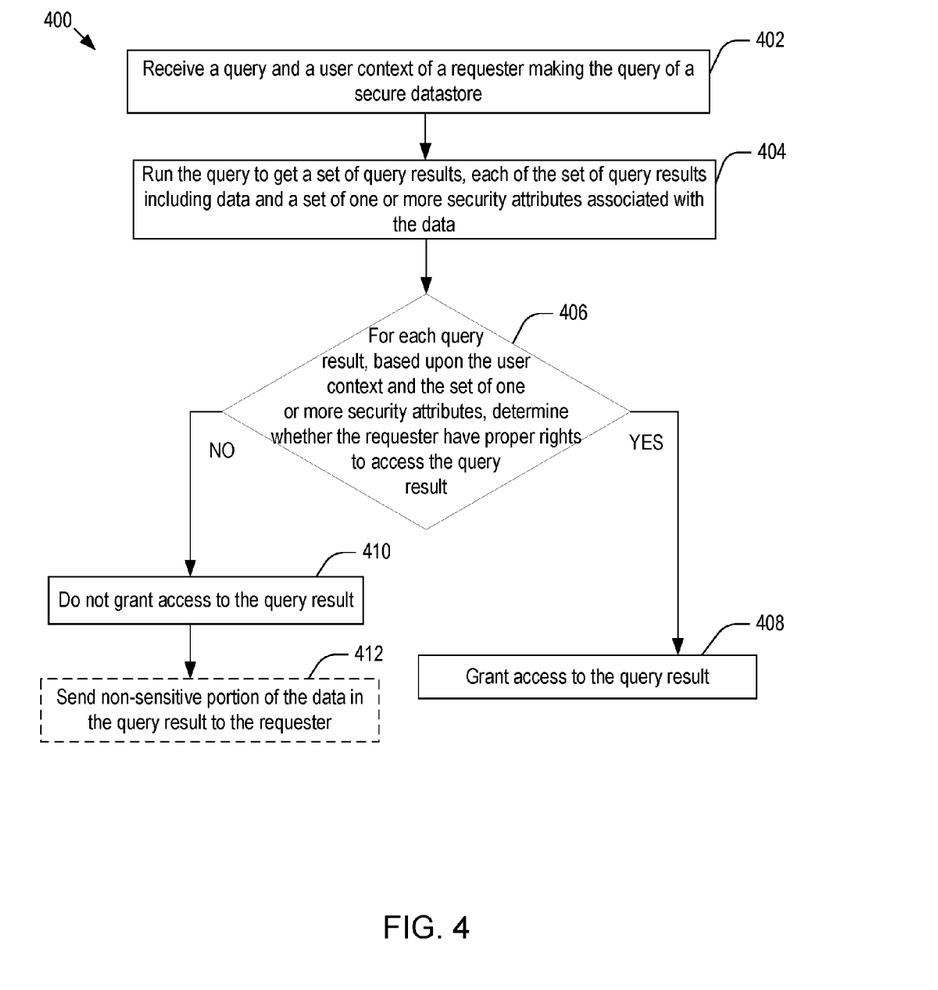
FIG. 4 shows a flowchart of an illustrative process for providing a query service according to embodiments of the present disclosure.

FIG. 4 shows a flowchart 400 of an illustrative process for providing a query service according to embodiments of the present disclosure. At step 402, the query service 204 receives a query from a user (requester) of an analytics/administration service 202. In embodiments, the query may include user context and optionally data/content identifier (ID). In embodiments, the query may include necessary key to decrypt the requested data if the data is encrypted by the data collection service 104. It is noted that the query service 204 may receive the query through other suitable type of applications that are similar to the analytics/administration service 202. Also, it is noted that the query may include various types of request, such as analytics associate with business or retrieving documents associated with a project, so on. For the purpose of illustration, the query is assumed to be a request to retrieve all the emails associated with "project X." Then, the query service 204 sends the user context and optionally data/content ID to the data access control 206.

At step 404, the data access control 206 runs the query to get a set of query results, where each query result includes data and a set of one or more security attributes associated with the data. For instance, the query results include all emails associated with "project X."

At step 406, for each query result, considering the set of one or more security attributes of the data and the user context, the data access control 206 determines whether the requester has proper rights to access the query result. In embodiments, the data access control 206 may contact external systems, such as RMS server 106b, for privilege/access information and/or contact Active Directory (AD) for AD information. In embodiments, the data access control 206 sends the user context and security attributes to the RMS server 106b so that the RMS server 106b can determine whether the user has the right to access the data/content. In another example, the data access control 206 get user's email address from AD and determine if the user is a part of the email recipient or sender before allowing access to the email content or get user's group membership before allowing access to document content that is restricted to a certain group membership.

In embodiments, the data access control 206 may determine whether the query includes necessary key to decrypt the requested data, where the requested data is protected by the data collection service 104 using a symmetric or asymmetric encryption.

Figure 5:
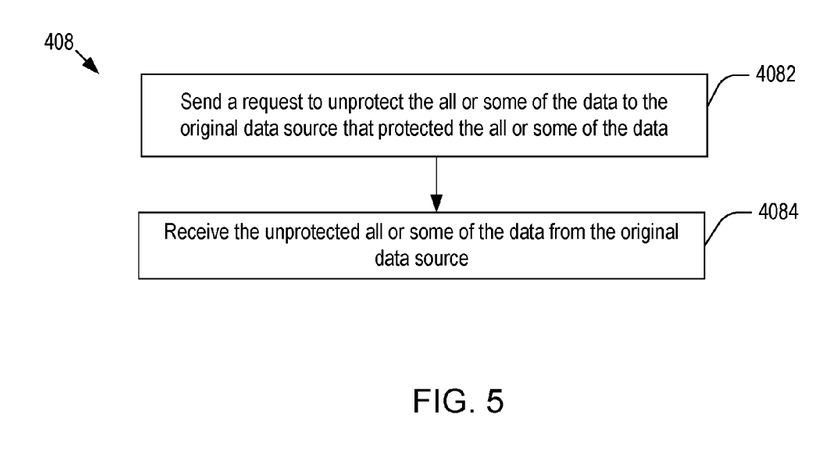
FIG. 5 shows a flowchart of an illustrative process for unprotecting data according to embodiments of the present disclosure.

If the answer to the decision at step 406 is positive, the data access control grants access to the requester and returns the query result to the query service 204 at step 408. In embodiment, the security attributes of the data may indicate that a portion of the data was protected according to the original security context, such as RMS protection, before the data was stored in the data storage 108. In such a case, the step 408 may include additional steps. FIG. 5 shows detailed description of step 408 according to embodiments of the present disclosure. At step 4082, the data access control 206 may send a request to unprotect (encrypt) the protected portion of the data to the original data source, e.g., RMS server 106b, that encrypted the portion of the data. In embodiments, the data access control 206 may use the user context to access the protected content of the data via an application (such as RMS aware application) that communicates with the original data source (such as RMS server 106b). Then, at step 4082, the original data source unprotects the all or some of the data and the data access control 206 receives the unprotected (decrypted) data from the original data source.

Referring back to FIG. 4, the process proceeds to step 410 responsive to the negative answer to step 406. At step 410, the data access control 206 does not grant access to the requester. In embodiments, when the access to the query result is restricted, the data access control 206 filters out the query result and does not send any notice to the requester about the filtered out result so as to prevent information leakage. For instance, when a requester searches for a term "acquisition" in all emails a person sent, the data access control 206 does not inform the requester that the requester does not have access to some of emails that includes "acquisition." The data access control 206 may just return no result for all the emails the requester does not have access to and only return the result from the emails that the requester has access to. Thus, in embodiments, if the requester has a permission to access a portion of the query result, only the portion is sent to the requester. Optionally, at step 412, the data access control 206 may send a non-sensitive portion of the data to the query service 204.

Unlike the conventional system that encrypt the data in a standard format, in embodiments, only redacted portion may be protected (encrypted), providing various access levels to the users of the analytics/administration service 202. In embodiments, each email includes unprotected metadata that shows the sender and receiver(s) of the email and protected body. If the query requester is one of the sender or receiver, the data access control 206 may return the email content to the requester. If the requester is an investigator who wants to read the body of each email associated with the "project X," the data access control 206 needs to go through the steps in FIG. 4 to provide the body content to the requester. Thus, depending on the type of query, the data access control 206 performs different steps to provide different information to the requester.

Typically, the conventional system stores emails in an email box and the entire email box is encrypted using an encryption key in a standard format. As such, if the security context of the email box is changed and the encryption key information cannot be found, the email box cannot be opened. In marked contrast, in embodiments, each email is protected either partially or entirely using its own security attributes, obviating the prior art problems associate with the security context change of the email box.

When the query service 204 receives the requested data from the data access control 206, it sends the data to the analytics/administration service 202. Then, the analytics/administration solution 202 may process the data and display the result to the requester. It should be apparent to those of ordinary skill in the art that other suitable types of software application may interact with the query requester and display the result i.e., the analytics/administration service 202 is one exemplary software application that interacts with the query requester and the query service 204.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present disclosure may be implemented in any instruction-execution/computing device or system capable of processing data, including, without limitation phones, laptop computers, desktop computers, and servers. The present disclosure may also be implemented into other computing devices and systems. Furthermore, aspects of the present disclosure may be implemented in a wide variety of ways including software (including firmware), hardware, or combinations thereof. For example, the functions to practice various aspects of the present disclosure may be performed by components that are implemented in a wide variety of ways including discrete logic components, one or more application specific integrated circuits (ASICs), and/or program-controlled processors. It shall be noted that the manner in which these items are implemented is not critical to the present disclosure.

Figure 6:
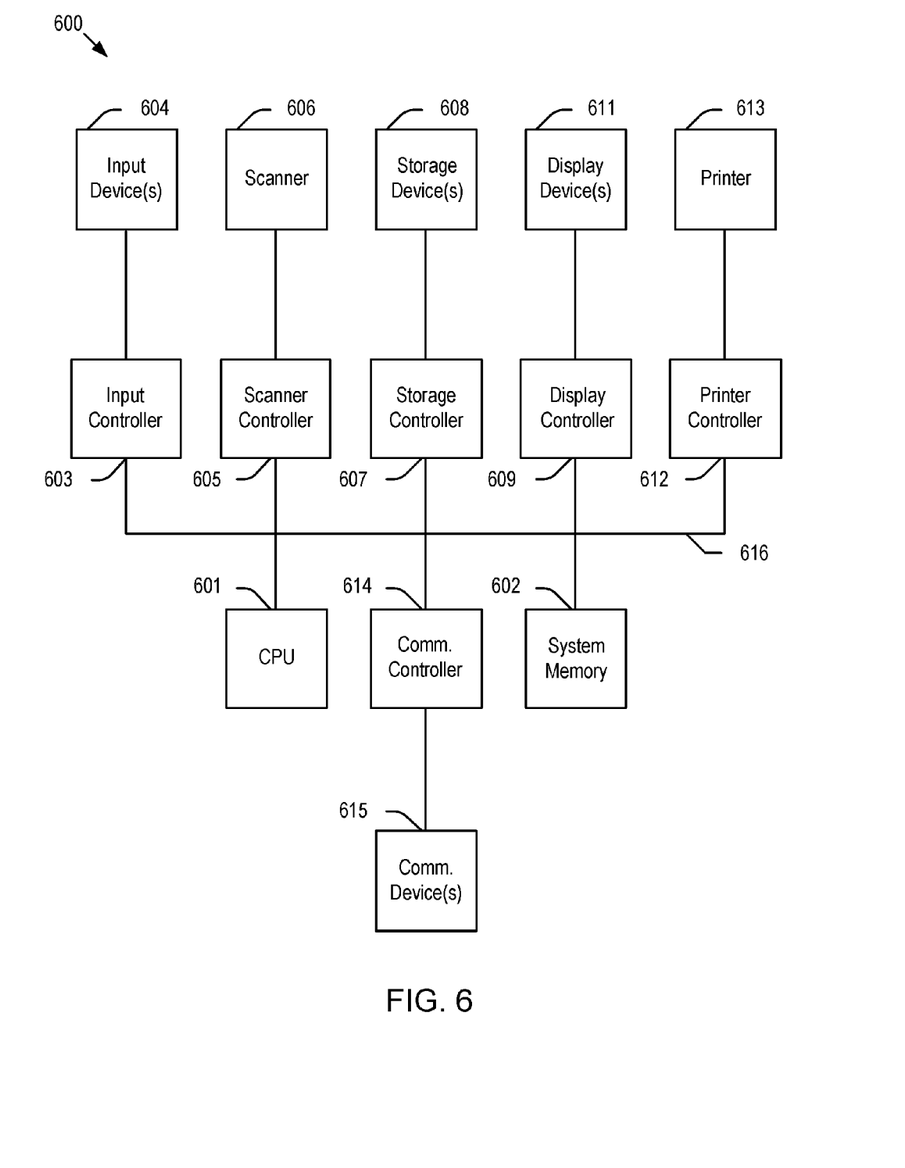
FIG. 6 shows a computer system according to embodiments of the present disclosure.

Having described the details of the disclosure, an exemplary system 600, which may be used to implement one or more aspects of the present disclosure, will now be described with reference to FIG. 6. Each client/server in FIG. 1 includes one or more components in the system 600. As illustrated in FIG. 6, system 600 includes a central processing unit (CPU) 601 that provides computing resources and controls the computer. CPU 601 may be implemented with a microprocessor or the like, and may also include a graphics processor and/or a floating point coprocessor for mathematical computations. System 600 may also include a system memory 602, which may be in the form of random-access memory (RAM) and read-only memory (ROM).

A number of controllers and peripheral devices may also be provided, as shown in FIG. 6. An input controller 603 represents an interface to various input device(s) 604, such as a keyboard, mouse, or stylus. There may also be a scanner controller 605, which communicates with a scanner 606. System 600 may also include a storage controller 607 for interfacing with one or more storage devices 608 each of which includes a storage medium such as magnetic tape or disk, or an optical medium that might be used to record programs of instructions for operating systems, utilities and applications which may include embodiments of programs that implement various aspects of the present disclosure. Storage device(s) 608 may also be used to store processed data or data to be processed in accordance with the disclosure. System 600 may also include a display controller 609 for providing an interface to a display device 611, which may be a cathode ray tube (CRT), a thin film transistor (TFT) display, or other type of display. System 600 may also include a printer controller 612 for communicating with a printer 613. A communications controller 614 may interface with one or more communication devices 615, which enables system 600 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of this disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure.

What is claimed is:

1. A computer-implemented method, the method comprising:
    collecting electronic data and security context associated with the electronic data from a data source;
    extracting, from the electronic data, a set of one or more security attributes associated with accessing the electronic data using at least the security context associated with the electronic data;
    protecting at least a portion of the electronic data by requesting the data source to protect the at least a portion of the electronic data;
    receiving the at least a portion of the protected electronic data;
    storing the protected electronic data in a datastore;
    storing in the datastore the set of one or more security attributes as metadata to the electronic data, the set of one or more security attributes being used to determine access to the electronic data so that access to the electronic data is consistent with the security context;
    receiving a query and a user context of a requester making the query of the datastore;
    running the query to get a set of query results, each of the set of query results including the electronic data and the set of one or more security attributes associated with the electronic data;
    for each of the set of query results:
    based on the user context and the set of one or more security attributes, determining whether the requestor has a proper right to access the query result;
    responsive to having the proper right to access the query result, granting access to the query result; and
    responsive to not having the proper right to access the query result, refraining to grant access to the query result.

2. The computer-implemented method claim 1, further comprising, prior to storing the data:
    determining whether all or some of the data needs to be protected.

3. The computer-implemented method claim 2, further comprising,
    responsive to the all or some of the data that needs to be protected, protecting the all or some of the data in a protection format that is consistent with the security context.

4. The computer-implemented method claim 2, wherein determining whether the all or some of the data of the data needs to be protected is based on at least one of Information Rights management (IRM) information associated with the data, metadata information associated with the data, items in the data and classification information associated with the data.

5. The computer-implemented method claim 1, wherein the security context includes at least one of a list of people who are given a permission to access the data, a list of groups that are given a permission to access the data, information of protection that is used to protect all or some of the data, data security classification, organization policies/rules, and settings and restrictions to access the data.

6. The computer-implemented method claim 5, wherein the security attributes are derived from the security context and includes at least one of email headers/x-headers, right management services (RMS) license properties, file system permissions, data loss prevention (DLP) and classification metadata, metadata managed by a browser-based document management platform, alternate data stream (ADS), image/exchangeable-Image-File-Format (exif) metadata, and custom attributes stored in a database.

7. The computer-implemented method claim 1, further comprising:
    encrypting the security attributes and the data in an additional format that is independent of the security context.

8. A computer-implemented method, comprising:
    extracting, from electronic data, a set of one or more security attributes associated with accessing the electronic data using a security context associated with the electronic data;
    protecting at least a portion of the electronic data;
    storing the set of one or more security attributes as metadata to the electronic data, the set of one or more security attributes being used to determine access to the electronic data so that access to the electronic data is consistent with the security context;
    receiving a query and a user context of a requester making the query of a secure electronic datastore;
    running the query on the secure electronic datastore to get a set of query results, each of the set of query results including electronic data and a set of one or more security attributes associated with the electronic data;
    for each of the set of query results:
    based on the user context and the set of one or more security attributes, determining whether the requestor has a proper right to access the query result;
    responsive to a determination that the requester has the proper right to access the query result, granting access to the query result to the requester, wherein granting the access comprises unprotecting all or some of the electronic data by:

contacting a data source that protected the all or some of the electronic data to unprotect the all or some of the electronic data; and
receiving the unprotected all or some of the electronic data from the original data source; and
responsive to a determination that the requester does not have the proper right to access the query result, not granting access to the query result to the requester.

9. The computer-implemented method claim 8, further comprising:
responsive to the requester not being allowed to access the query result, from sending the query result to the requester.

10. The computer-implemented method claim 8, further comprising:
responsive to the query result having a non-protected portion, sending the non-protected portion of the query result to the requestor.

11. The computer-implemented method claim 8, wherein the user context comprises information that is used to uniquely identify the requester.

12. The computer-implemented method claim 8, wherein the security attributes are derived from the security context and include at least one of email headers/x-headers, right management services (RMS) license properties, file system permissions, data loss prevention (DLP) and classification metadata, metadata managed by a browser-based document management platform, alternate data stream (ADS), image/exchangeable-Image-File-Format (exif) metadata, and custom attributes stored in a database.

13. An information handling system for providing query service of protected data, comprising:
one or more processors;
a datastore; and
a non-transitory computer-readable medium or media comprising one or more sequences of instructions which, when executed by the one or more processors, the information system to perform operations comprising:
collect electronic data and security context associated with the electronic data from a data source;
extract, from the electronic data, a set of one or more security attributes associated with accessing the electronic data using at least the security context associated with the electronic data;
protect at least a portion of the electronic data by requesting the data source to protect the at least a portion of the electronic data;
receive the at least a portion of the protected electronic data;
store the protected electronic data in the datastore;
store in the datastore the set of one or more security attributes as metadata to the data, the set of one or more security attributes being used to determine access to the electronic data so that access to the data is consistent with the security context;
receive a query and a user context of a requester making the query of the datastore;
run the query to get a set of query results, each of the set of query results including the electronic data and the set of one or more security attributes associated with the electronic data;
for each of the set of query results:
based upon the user context and the set of one or more security attributes, determine whether the requestor has a proper right to access the query result;
responsive to having the proper right to access the query result, grant access to the query result; and
responsive to not having the proper right to access the query result, refrain to grant access to the query result.

14. The information handling system claim 13, wherein be performed further comprises, prior to storing the electronic data:
determining whether all or some of the electronic data needs to be protected based on at least one of Information Rights management (IRM) information associated with the electronic data, metadata information associated with the electronic data, items in the electronic data and classification information associated with the electronic data.

15. The information handling system claim 13, wherein not granting access to the query result includes sending a non-sensitive portion of the query result to the requester.

16. The information handling system of as recited in claim 13, wherein the step of granting an access includes:
unprotecting all or some of the data.

* * * * *